United States Patent
Park

(10) Patent No.: US 9,651,079 B2
(45) Date of Patent: May 16, 2017

(54) FASTENER WITH PROLATE CROSS-SECTION

(71) Applicant: SIMPSON STRONG-TIE COMPANY, INC., Pleasanton, CA (US)

(72) Inventor: Jeremy Scott Park, Bethpage, TN (US)

(73) Assignee: SIMPSON STRONG-TIE COMPANY, INC., Pleasanton, CA (US)

( * ) Notice: Subject to any disclaimer, the term of this patent is extended or adjusted under 35 U.S.C. 154(b) by 201 days.

(21) Appl. No.: 13/848,722

(22) Filed: Mar. 21, 2013

(65) Prior Publication Data

US 2014/0286728 A1    Sep. 25, 2014

(51) Int. Cl.
- *F16B 25/10* (2006.01)
- *F16B 35/04* (2006.01)
- *F16B 25/00* (2006.01)

(52) U.S. Cl.
CPC ........ *F16B 35/041* (2013.01); *F16B 25/0015* (2013.01); *F16B 25/0078* (2013.01)

(58) Field of Classification Search
CPC . F16B 35/041; F16B 25/0015; F16B 25/0078
USPC ............................... 411/387.2, 386, 411, 424
See application file for complete search history.

(56) References Cited

U.S. PATENT DOCUMENTS

| | | | |
|---|---|---|---|
| 373,074 A | 11/1887 | Jones | |
| 430,236 A | 6/1890 | Rogers | |
| 432,526 A * | 7/1890 | Greer | ............................. 238/260 |
| 470,804 A | 3/1892 | Jones | |
| 684,774 A * | 10/1901 | Baggs | ..................... F16B 25/00 408/199 |
| 867,552 A | 10/1907 | Bradford et al. | |
| 1,396,455 A | 11/1921 | Moore | |
| 1,830,554 A | 11/1931 | McMullin | |
| 2,263,137 A | 11/1941 | Louis | |
| 2,869,224 A | 1/1959 | Forster | |

(Continued)

FOREIGN PATENT DOCUMENTS

| | | |
|---|---|---|
| AU | 494077 | 10/1977 |
| DE | 8329783 U1 | 6/1985 |

(Continued)

OTHER PUBLICATIONS

Response to Office Action dated Feb. 13, 2017, in U.S. Appl. No. 14/536,071, filed Nov. 7, 2014.

(Continued)

*Primary Examiner* — Gary Estremsky
(74) *Attorney, Agent, or Firm* — Vierra Magen Marcus LLP

(57) ABSTRACT

A fastener includes a shank having a point at a first end and a second, head end. One or more prolate cross-section regions is formed in the shank. Prolate cross-section regions may be formed in a threaded section and/or a thread free section of the fastener. Each prolate cross-section may have a polar diameter greater than the cylindrical diameter of the region in which it is formed and an equatorial diameter smaller than the corresponding cylindrical diameter of the region in which it is formed. Two generally adjacent prolate cross-section regions have cross-sections offset with respect to each other by an angle between zero and ninety-degrees.

24 Claims, 6 Drawing Sheets

(56) References Cited

U.S. PATENT DOCUMENTS

| | | | | |
|---|---|---|---|---|
| 3,258,797 | A * | 7/1966 | Budd | B21H 3/10 408/26 |
| 3,478,369 | A | 11/1969 | Joseph | |
| 3,478,639 | A | 11/1969 | Gruca | |
| 3,661,046 | A | 5/1972 | Waud et al. | |
| 3,682,507 | A | 8/1972 | Waud | |
| 3,724,315 | A * | 4/1973 | Sygnator | 411/386 |
| 3,978,760 | A * | 9/1976 | Muenchinger | 411/386 |
| 4,034,641 | A * | 7/1977 | Williams, Jr. | F16B 25/0031 411/387.7 |
| 4,541,270 | A | 9/1985 | Hanslik | |
| 4,653,244 | A | 3/1987 | Farrell | |
| 4,834,602 | A | 5/1989 | Takasaki | |
| 4,874,278 | A | 10/1989 | Kawashita | |
| 4,878,793 | A | 11/1989 | Hewison | |
| 5,015,134 | A | 5/1991 | Gotoh | |
| 5,044,855 | A | 9/1991 | Fukubayashi | |
| 5,199,839 | A | 4/1993 | DeHaitre | |
| 5,209,753 | A | 5/1993 | Biedermann et al. | |
| 5,482,418 | A | 1/1996 | Giannuzzi | |
| 5,509,370 | A | 4/1996 | Kovacs et al. | |
| 5,516,248 | A | 5/1996 | DeHaitre | |
| 5,536,127 | A | 7/1996 | Penning | |
| 5,570,983 | A | 11/1996 | Hollander | |
| 5,772,376 | A | 6/1998 | Konig | |
| 5,779,417 | A | 7/1998 | Barth et al. | |
| 5,827,030 | A | 10/1998 | Dicke | |
| 5,895,187 | A | 4/1999 | Kuo-Tai | |
| 5,897,280 | A | 4/1999 | Dicke | |
| 5,987,837 | A | 11/1999 | Nelson | |
| 6,000,892 | A | 12/1999 | Takasaki | |
| 6,050,765 | A | 4/2000 | McGovern et al. | |
| 6,056,491 | A | 5/2000 | Hsu | |
| 6,086,302 | A | 7/2000 | Gerhard | |
| 6,086,303 | A | 7/2000 | Fluckiger | |
| 6,109,850 | A | 8/2000 | Commins | |
| 6,116,836 | A * | 9/2000 | Long, Sr. | 411/451.1 |
| 6,227,430 | B1 | 5/2001 | Rosen et al. | |
| 6,296,433 | B1 | 10/2001 | Forsell et al. | |
| 6,302,631 | B1 | 10/2001 | Takasaki et al. | |
| 6,328,515 | B1 * | 12/2001 | Donovan | 411/386 |
| 6,328,516 | B1 | 12/2001 | Hettich | |
| 6,332,741 | B1 | 12/2001 | Janusz | |
| 6,394,723 | B1 | 5/2002 | Cassel | |
| 6,514,026 | B1 | 2/2003 | Gerhard | |
| 6,558,097 | B2 | 5/2003 | Mallet et al. | |
| 6,616,391 | B1 | 9/2003 | Druschel | |
| 6,644,904 | B2 | 11/2003 | Chen et al. | |
| 6,666,638 | B2 | 12/2003 | Craven | |
| 6,698,987 | B1 | 3/2004 | Dicke | |
| 6,789,991 | B2 | 9/2004 | Hsu | |
| 6,854,942 | B1 | 2/2005 | Hargis | |
| 6,941,635 | B2 | 9/2005 | Craven | |
| 6,976,818 | B2 | 12/2005 | Levey et al. | |
| 7,037,059 | B2 | 5/2006 | Dicke | |
| 7,090,453 | B2 | 8/2006 | Lin | |
| 7,163,366 | B2 | 1/2007 | Chen | |
| 7,293,947 | B2 | 11/2007 | Craven | |
| 7,402,016 | B2 | 7/2008 | Yin-Feng | |
| 7,604,445 | B1 | 10/2009 | Dicke | |
| 7,682,118 | B2 | 3/2010 | Gong et al. | |
| 7,740,435 | B2 | 6/2010 | Gstach et al. | |
| 7,862,279 | B2 | 1/2011 | Stiebitz et al. | |
| RE42,207 | E | 3/2011 | Janusz | |
| 8,182,185 | B2 | 5/2012 | Gahn et al. | |
| 8,182,186 | B2 | 5/2012 | Huber et al. | |
| 8,348,571 | B2 | 1/2013 | Shih | |
| 8,360,702 | B2 | 1/2013 | Yu | |
| 8,430,618 | B2 | 4/2013 | Baer et al. | |
| 2002/0114682 | A1 | 8/2002 | Forster | |
| 2003/0021653 | A1 * | 1/2003 | Takasaki | F16B 25/0015 411/387.1 |
| 2003/0026675 | A1 | 2/2003 | McGovern et al. | |
| 2004/0141827 | A1 | 7/2004 | Dicke | |
| 2004/0197139 | A1 | 10/2004 | McGovern et al. | |
| 2005/0079031 | A1 | 4/2005 | Mizuno et al. | |
| 2006/0269380 | A1 | 11/2006 | Yin-Feng | |
| 2007/0055236 | A1 | 3/2007 | Hudgins et al. | |
| 2007/0128001 | A1 | 6/2007 | Su | |
| 2007/0166124 | A1 | 7/2007 | Hsu | |
| 2007/0224019 | A1 | 9/2007 | Hale | |
| 2007/0286701 | A1 | 12/2007 | Hsu | |
| 2008/0080951 | A1 | 4/2008 | Lin | |
| 2009/0092463 | A1 | 4/2009 | Oberndorfer et al. | |
| 2009/0112269 | A1 | 4/2009 | Lieberman et al. | |
| 2009/0162165 | A1 | 6/2009 | Chen | |
| 2011/0110745 | A1 | 5/2011 | Shih | |
| 2013/0039720 | A1 | 2/2013 | Shih | |
| 2015/0010374 | A1 | 1/2015 | Park | |

FOREIGN PATENT DOCUMENTS

| | | |
|---|---|---|
| DE | 4439535 A1 | 5/1996 |
| DE | 29621922 U | 4/1998 |
| DE | 19846993 A1 | 4/2000 |
| DE | 19857311 A1 | 6/2000 |
| DE | 202004011145 U1 | 9/2004 |
| DE | 202005006493 U1 | 6/2005 |
| DE | 202010016409 U | 2/2011 |
| EP | 0012441 A1 | 6/1980 |
| EP | 1411252 A2 | 4/2004 |
| EP | 2092995 A2 | 8/2009 |
| EP | 2289647 A1 | 3/2011 |
| GB | 2235744 A | 3/1991 |
| GB | 2454464 A | 5/2009 |
| JP | 2002349528 A | 12/2002 |
| WO | 93/23680 | 11/1993 |

OTHER PUBLICATIONS

Notice of Allowance dated Jul. 25, 2014, in U.S. Appl. No. 12/142,082, filed Jun. 19, 2008.

Schmid Schrauben Hainfeld GmbH, RAPID Komprex, retrieved from website on Sep. 14, 2013: http://www.schrauben.at/files/rapid_komprex.pdf.

DIBT, Approval communication for Reg. No. Z-9.1-564, Jul. 1, 2008.

International Search report and Written Opinion dated Oct. 2, 2013, in International Appl. No. PCT/US2013/051704 filed Jul. 23, 2013.

Office Action dated Nov. 5, 2009, in U.S. Appl. No. 12/142,082, filed Jun. 19, 2008.

Amendment dated May 4, 2010, in U.S. Appl. No. 12/142,082, filed Jun. 19, 2008.

Office Action dated Jul. 13, 2010, in U.S. Appl. No. 12/142,082, filed Jun. 19, 2008.

Amendment dated Jan. 13, 2011, in U.S. Appl. No. 12/142,082, filed Jun. 19, 2008.

Office Action dated Feb. 28, 2013, in U.S. Appl. No. 12/142,082, filed Jun. 19, 2008.

Amendment dated Aug. 27, 2013, in U.S. Appl. No. 12/142,082, filed Jun. 19, 2008.

Office Action dated Oct. 3, 2013, in U.S. Appl. No. 12/142,082, filed Jun. 19, 2008.

Restriction mailed Oct. 31, 2014, in U.S. Appl. No. 13/850,606, filed Mar. 26, 2013.

Amendment dated Mar. 31, 2015, in U.S. Appl. No. 13/850,606, filed Mar. 26, 2013.

Office Action mailed Apr. 24, 2015, in U.S. Appl. No. 13/850,606, filed Mar. 26, 2013.

Amendment dated Jul. 24, 2015, in U.S. Appl. No. 13/850,606, filed Mar. 26, 2013.

Office Action mailed Sep. 15, 2015, in U.S. Appl. No. 13/850,606, filed Mar. 26, 2013.

International Search Report mailed Aug. 4, 2014, in International Patent Appl. No. PCT/US2014/031300 filed Mar. 20, 2014.

International Preliminary Report on Patentability mailed Oct. 1, 2015, in International Patent Appl. No. PCT/US2014/031300 filed Mar. 20, 2014.

(56) References Cited

OTHER PUBLICATIONS

International Preliminary Report on Patentability mailed Oct. 1, 2015, in International Patent Appl. No. PCT/US2014/031324 filed Mar. 20, 2014.
International Search Report and Written Opinion mailed Dec. 4, 2015, in International Patent Appl. No. PCT/US2015/050918 filed Sep. 18, 2015.
Notice of Allowance mailed Jul. 19, 2016, in U.S. Appl. No. 14/493,029, filed Sep. 22, 2014.
Amendment dated Jul. 28, 2016, in European Patent Appl. No. 14716742.3 filed Mar. 20, 2014.
Communication Rule 71(3) EPC intention to grant, dated Jul. 18, 2016, in European Patent Application No. 13724139.4 filed May 10, 2013.
Office Action dated Aug. 12, 2016, in U.S. Appl. No. 14/536,071, filed Nov. 7, 2014.
Amendment dated Jul. 27, 2016, in European Patent Appl. No. 14723214.4 filed Mar. 20, 2014.
Amendment dated Mar. 15, 2016, in U.S. Appl. No. 13/850,606, filed Mar. 26, 2013.
Office Action dated May 5, 2016, in U.S. Appl. No. 13/850,606, filed Mar. 26, 2013.
Amendment dated Nov. 7, 2016, in U.S. Appl. No. 13/850,606, filed Mar. 26, 2013.
Office Action dated Dec. 21, 2015, in U.S. Appl. No. 14/493,029, filed Sep. 22, 2014.
Amendment dated Jun. 13, 2016, in U.S. Appl. No. 14/493,029, filed Sep. 22, 2014.
International Search report and Written Opinion dated Jul. 1, 2014, in International Appl. No. PCT/US2014/031324 filed Mar. 20, 2014.
Amendment dated Apr. 2, 2014, in U.S. Appl. No. 12/142,082, filed Jun. 19, 2008.
Final Office Action dated Dec. 16, 2016, in U.S. Appl. No. 13/850,606, filed Mar. 26, 2013.
Notice of Allowance dated Aug. 26, 2016, in U.S. Appl. No. 13/468,861, filed May 10, 2012.
Notice of Allowance dated Sep. 1, 2016, in U.S. Appl. No. 14/493,029, filed Sep. 22, 2014.

* cited by examiner

Y - Y

Z - Z

D - D

E - E

FASTENER WITH PROLATE CROSS-SECTION

BACKGROUND

Fastener designs have been used to improve specific characteristics fasteners in different materials. Ultimately, the fastener needs to bind one material to another securely and efficiently. Screw-type fasteners generally include a threaded shank with a pointed tip at one end thereof and a head at the other end. The head has a recess for accepting a driver tip. Some heads are designed to be recessed in a fastened material, while others are designed to embed into the material so that the head is flush with a surface of the bound material.

SUMMARY

Technology is described herein which comprises a fastener having one or more prolate cross-section regions formed in the shank. The fastener includes a shank having a first region with a generally cylindrical cross-section with a helical thread, which may or may not be followed by a thread-free shank section. In one embodiment where a thread free section is provided, the first region has a smaller cylindrical diameter than the thread-free region. One or more prolate cross-section regions may be formed in the first section and the thread free section. One or more prolate cross-section regions may be formed to a length approximately equal to the pitch of the helical thread, or larger or smaller lengths. Each prolate cross-section region may have a polar diameter greater than the cylindrical diameter of the region in which it is formed and an equatorial diameter smaller than the corresponding cylindrical diameter of the region in which it is formed. Two generally adjacent prolate cross-section regions have cross-sections offset with respect to each other by ninety-degrees. The cross-sectional offset may be at any angle between 1 and 90 degrees.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
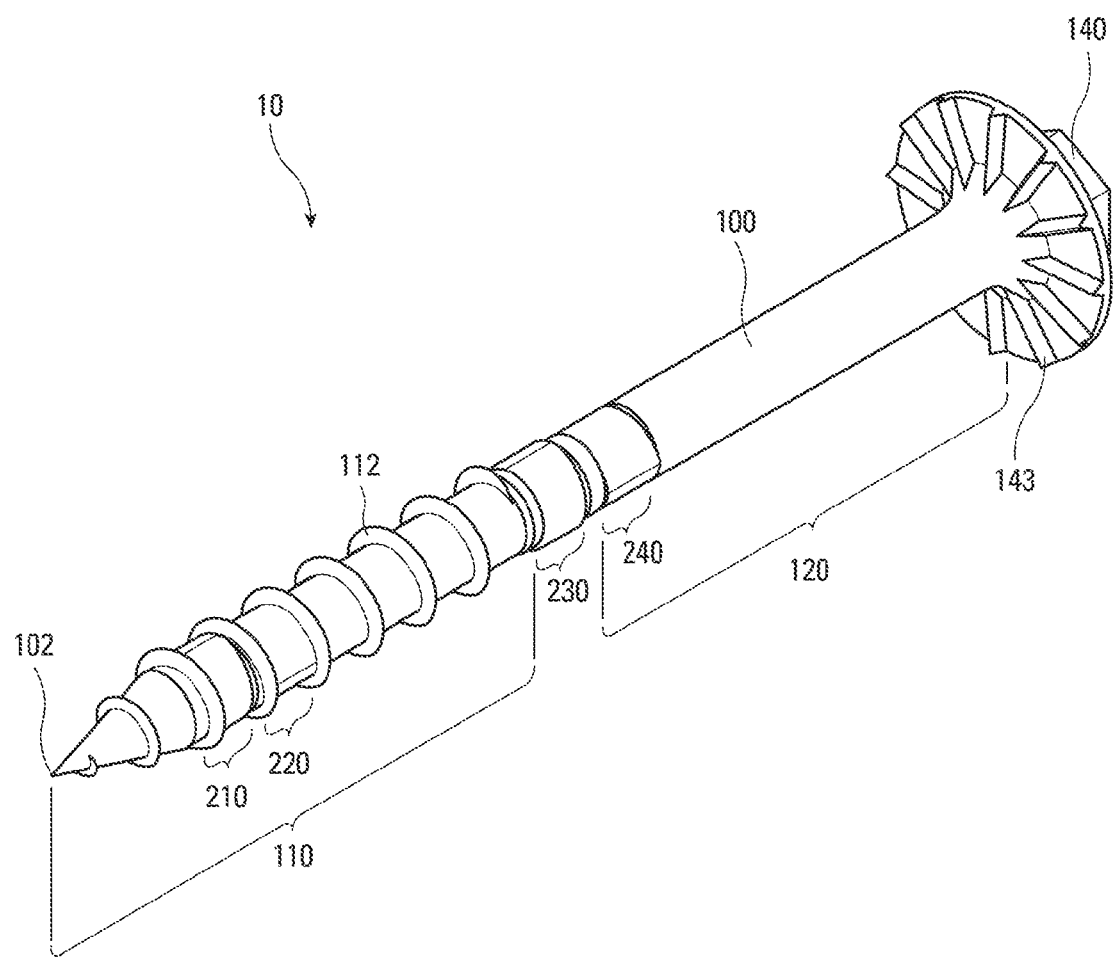
FIG. 1 is a perspective view of a first embodiment of a fastener in accordance with the present technology.
Figure 2:
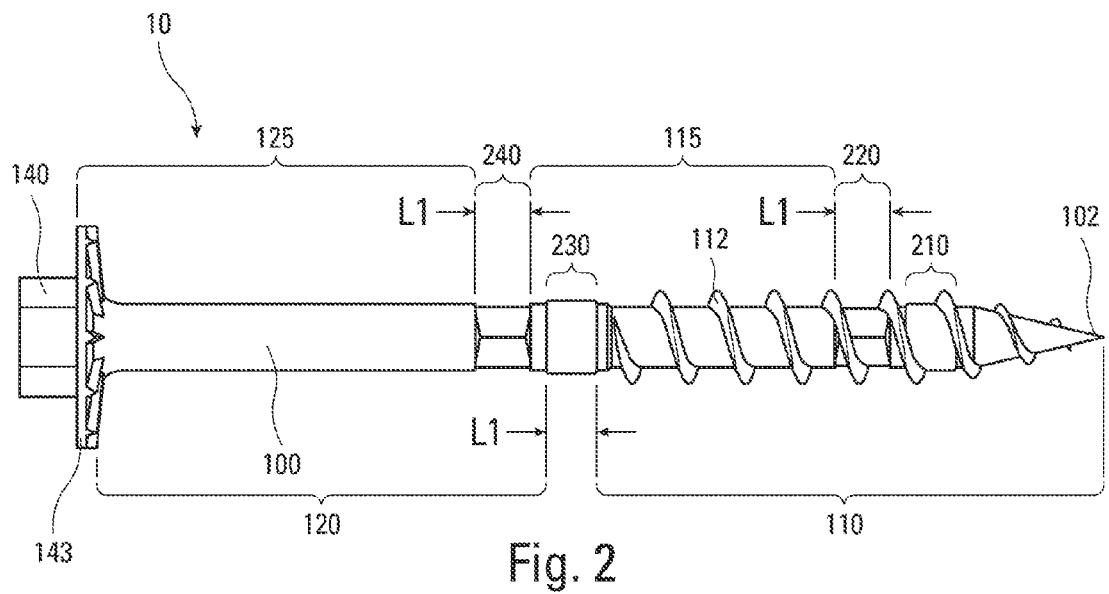
FIG. 2 depicts a plan view of a first embodiment of a fastener in accordance with the present technology.
Figure 3:
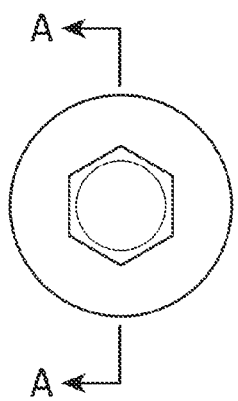
FIG. 3 depicts an end view of a first embodiment of a fastener in accordance with the present technology.
Figure 4:
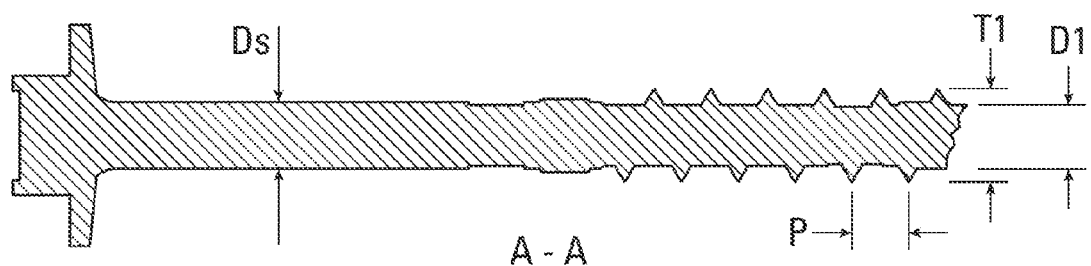
FIG. 4 depicts a partial, cross-sectional view of a first embodiment of a fastener in accordance with the present technology.
Figure 5:
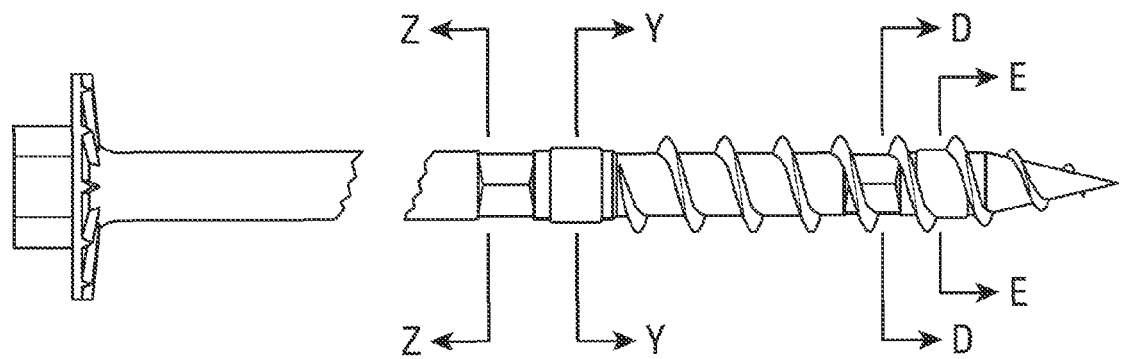
FIG. 5 is a partial plan view of the first embodiment.

The technology described herein is a fastener having features allowing securing elements in wood, composite or other material and providing improved performance. The fastener requires less torque conventional fasteners and improves the ability of the head to the screw to enter the fastened material so that a surface of the screw is flush with a surface of the material.

The technology includes a threaded fastener having one or more prolate cross-section regions formed in the shank. Various embodiments of fasteners with prolate cross-sections are described herein. One embodiment of the fastener includes a shank having a first region with a generally cylindrical cross-section with a helical thread, followed by a thread-free shank section. The first section has a smaller cylindrical diameter than the thread-free section. One or more prolate cross-section regions may be formed in the first section and the thread free section. The cross-sections may be formed to a length approximately equal to the pitch of the helical thread. Each prolate cross-section regions may have a polar diameter greater than the cylindrical diameter of the region in which it is formed and an equatorial diameter smaller than the corresponding cylindrical diameter of the region in which it is formed.

A first embodiment of the fastener technology will be described with respect to FIGS. 1-9.

The fastener 10 of FIGS. 1-9 includes a shank 100 having a pointed tip 102 at one end thereof and a head 140 at another end. The shank may be formed of galvanized steel. The first region 110 extends from pointed tip 102 to second section 120. The body of the shank has a base shank diameter Ds (FIG. 4) in second section 120. The shank in region 120 has a cylindrical cross-section in regions other than the prolate cross-section regions described below. A first region 110 of the shank includes a helical thread 112 formed on the shank 100 extending to the tip 102. The shank in region 110 has a generally cylindrical shank diameter D1 which is smaller than Ds. The shank in region 110 has a cylindrical cross-section in regions other than the prolate cross-section regions described below. The thread 112 has an effective diameter T1, with a first thread height above the shank in the region 110 equivalent to $((T1-D1)/2)$ and a pitch P.

Figure 6:
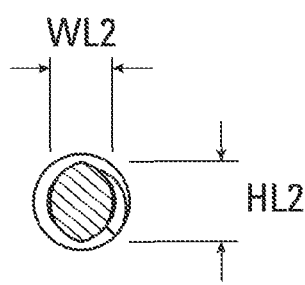
FIG. 6 is a view along line Y-Y in FIG. 5. F
Figure 7:
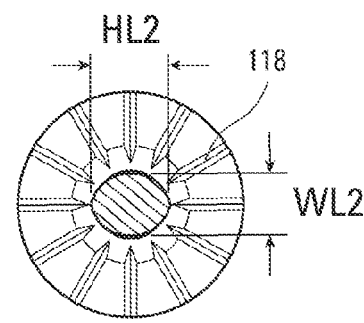
FIG. 7 is a view along line Z-Z in FIG. 5.

In the embodiment of FIGS. 1-9, prolate cross-section regions 210, 220, 230 and 240 are provided in the shank 100. A prolate cross-section for purposes of this disclosure includes a cross-section where a polar diameter is greater than the equatorial diameter, and may include, for example a elliptical cross-section or a lens-shaped cross-section formed by the intersections of two circles or disks. A prolate cross-section is shown in FIGS. 6 and 7. In one embodiment, the prolate cross-section regions may be a lens-shaped cross-section defined as formed by the intersection of two equal (symmetric) or unequal (asymmetric) disks. The intersections of two circles determine a line known as the radical line and referred to herein as the polar diameter. Although symmetric prolate cross-sections are shown herein, asymmetric cross-sections are within the scope of the technology. Each prolate cross-section has a length L1 of about one turn of the helical thread 112, or about equal to pitch P. In other embodiments, the length L1 may be shorter or longer than P. In one embodiment, all prolate cross-section regions are the same length; in another embodiment, the length of each prolate cross-section may vary, with multiple ones of sections provided in a fastener being equal or all prolate cross-section regions in a fastener being unequal.

Figure 8:
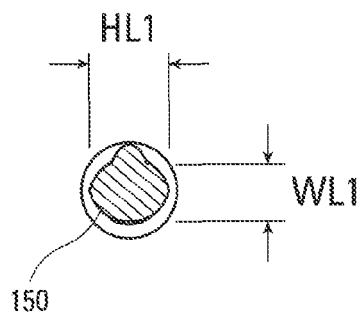
FIG. 8 is a view along line D-D in FIG. 5.
Figure 9:
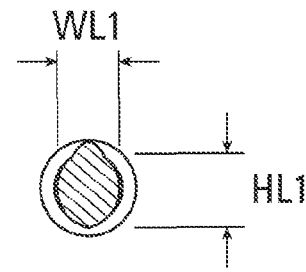
FIG. 9 is a view along line E-E in FIG. 5.

In one embodiment, the point of joinder of the two arcs—point 150 in FIG. 8—of each prolate cross-section is not a true hard edge but is joined at a radius between the two major arcs of the cross-section. Point 150 may have a radius of 0.015 inch, for example. Any cross-sectional shape having two rounded sides intersecting at a point or a rounded vertices of joinder may be used in the present technology for the prolate cross-section regions.

In FIGS. 1-9, two pairs 210,220, and 230, 240 of prolate cross-section regions are shown. In alternative embodiments, only one prolate cross-section is provided in the shank, or multiple cross-sections are provided with a similar orientation.

In the case of pairs 210, 220, and 230,240, each prolate shaped cross-section is rotated 90 degrees with respect to the other in a given pair. In alternative embodiment, prolate cross-section regions may be rotated or off-set with respect to their polar diameter by different angles. For example, a trio of prolate cross-section regions may be provided, each off-set from the other by 120 degrees. In a still further embodiment, only one cross-section may be provided, without a paired, ninety degree offset section.

As illustrated in FIG. 1 and in FIGS. 6 and 7, each prolate cross-section has a height or polar diameter dimension HL and a width or equatorial diameter dimension WL. In one embodiment, HL and WL are the same for each of the prolate cross-section regions 210, 220, 230 and 240.

In an alternative embodiment, the prolate cross-section regions in region 110 are slightly smaller than those in region 120. Hence, cross-sections 230 and 240 have dimensions HL2 and WL2, while 210 and 220 have dimensions HL1 and WL1.

Each prolate cross-section may have a polar diameter (HL) greater than the cylindrical diameter of the region in which it is formed and a equatorial diameter (WL) smaller than the corresponding cylindrical diameter of the region in which it is formed. In one embodiment, HL1:WL1 is approximately 1.0:1.4 and may be about 1.1-1.3; and HL2:WL2 is about 1.0-1.4 and may be bout 1.1-1.3. In one embodiment, the rear cross-section regions 230 and 240 are approximately 10 percent larger, such that: HL2:HL1 is between 1 and 1.3, and may be between 1 and 1.17; and WL2:WL1 is between 1 and 1.3, and may further be between 1 and 1.15.

In one embodiment, the relationship between the aforementioned dimensions includes one or more of the following:
  WL2 to DS is in a range of about 1.0-0.7;
  HL2 to DS is in a range of about 1.4-1.0;
  WL1 to D1 is in a range of about 1.0 to 0.7;
  HL1 to D1 is in a range of about 1.4-1.0;
  T1:D1 is in a range of about 1.7-1.4;
  L1:P is in a range of about 0.7-2.0;
  T1:DS is in a range of about 1.3-1.5; and
  DS:D1 is in a range of about 1-1.2;

The aforementioned ratios are exemplary for any of a number of different lengths of shank 100.

The use of the prolate cross-section regions in the present technology has been found to reduce the torque required to insert the screw in a fastened material. Manufacture of the fastener of the present technology is generally easier than fasteners with a "polygonal" cross-section as only two sides of the cross-section—the intersecting arcs—need to be formed. This means that the smallest dimension across the prolate cross-section is larger than what it would be if alternative, polygonal cross-sections were used.

To form the fastener with the prolate cross-section regions, the prolate cross-section regions are formed by rolling the respective sections of the fastener. Prior to the rolling process, a head 140 is by providing the base wire which eventually becomes the fastener through a head forming machine. Once a head is formed, a rolling press creates the prolate cross-section regions using a single formative step where the fastener is rolled between two plates that have all the features created in the roller. Because the area of the cross-sections along their width WL is greater, and the area of the fastener is only reduced relative to the shank in one direction, this provides a lower reduction in fastener bending strength as more steel remains and thus a higher torsional value than competing technologies is provided.

In operation, the leading cross-sections 210, 220 create a larger bore for the shank section following these cross-sections so that the rear portion 115 minor diameter D1 passes into the bore with less resistance and drag. This in turn reduces any coating loss on the fastener where the fastener has been provided with a bore coating. The second pair of cross-sections 230, 240 create a larger board for the rear portion 125 of the shank attempt to open up #

Figure 10:
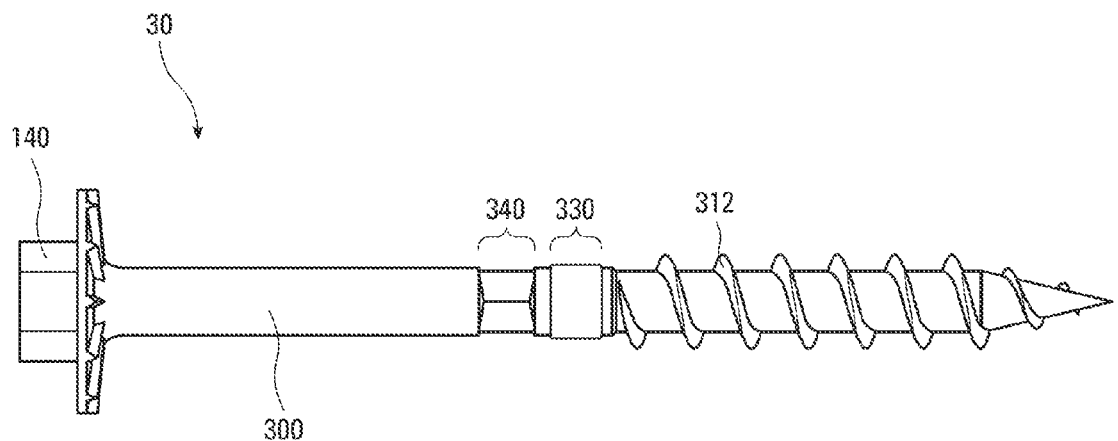
FIG. 10 depicts another embodiment of the fastener in accordance with the present technology including prolate cross-section regions following the threaded region.
Figure 11:
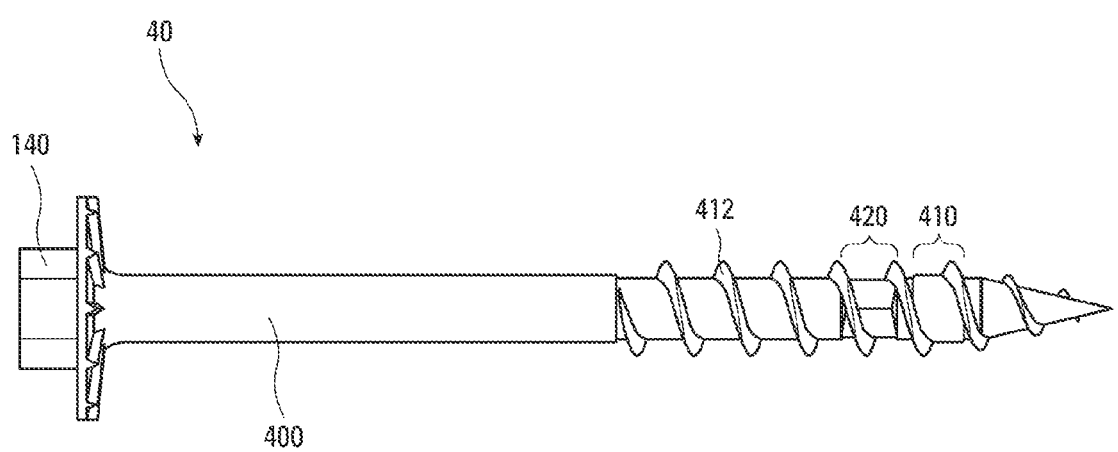
FIG. 11 depicts another embodiment of the fastener in accordance with the present technology including leading prolate cross-section regions.

FIGS. 10-13 illustrate various alternative embodiments of the present technology. FIG. 10 illustrates a fastener 30 with a shank 300 with single pair of cross-sections 330, 340, positioned following a helix 312. Sections 330 and 340 are equivalent in size and relationship to sections 230 and 240 in FIGS. 1-9. FIG. 11 illustrates another embodiment with a single pair of cross-sections. A fastener 40 with a shank 400 with single pair of cross-sections 410, 420, at the leading edge of the helix. Sections 410 and 420 are equivalent in size and relationship to sections 210 and 220 in FIGS. 1-9.

Figure 12:
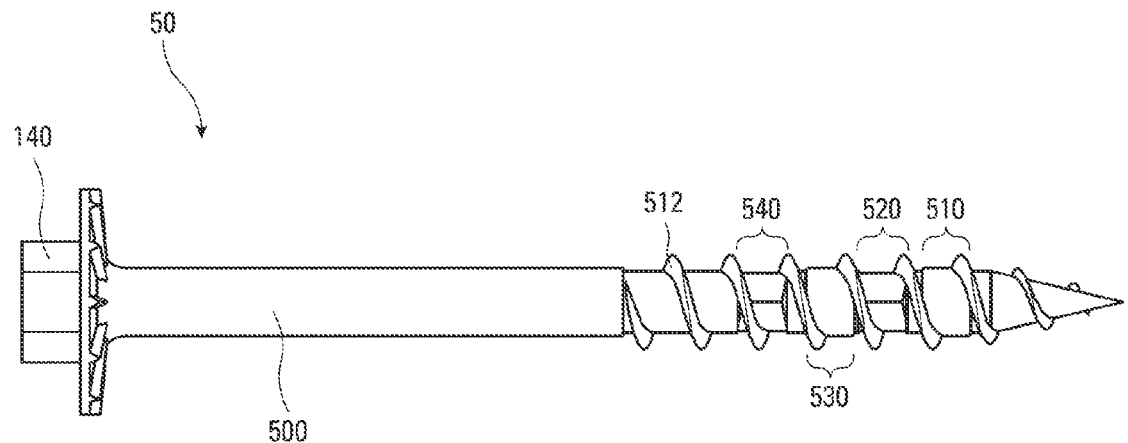
FIG. 12 depicts another embodiment of the fastener in accordance with the present technology including multiple pairs of prolate cross-section regions in the threaded region.

FIG. 12 illustrates another embodiment with back-to-back pairs cross-sections. A fastener 50 with a shank 500 has two pairs of cross-sections 510, 520, and 530,540 at the leading edge of the helix. Sections 510, 520 are equivalent in size and relationship to sections 210 and 220 in FIGS. 1-9. Sections 530 and 540 may be equivalent to sections 210 and 220 or may be equivalent to sections 230 and 240.

Figure 13:
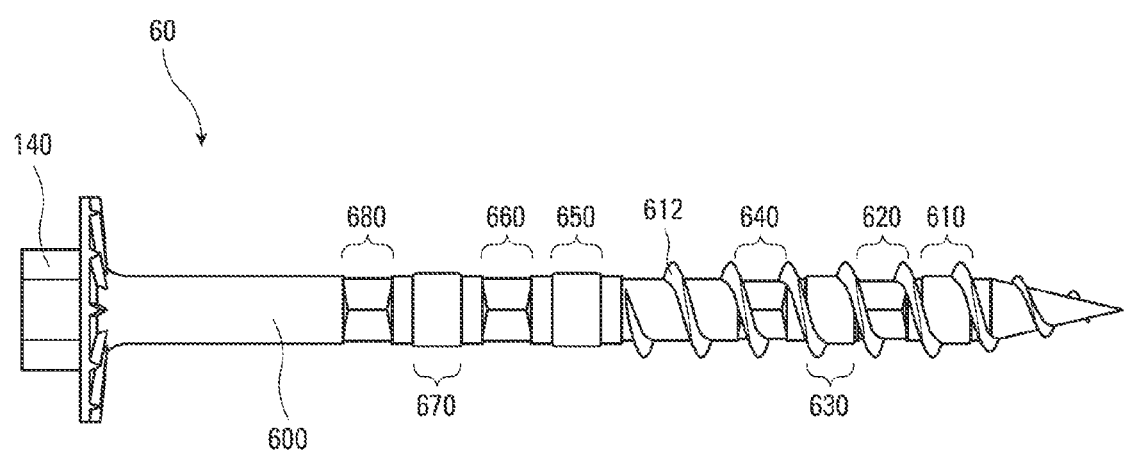
FIG. 13 depicts another embodiment of the fastener in accordance with the present technology including multiple pairs of prolate cross-section regions in the threaded region and following the threaded region.

FIG. 13 illustrates another embodiment with multiple back to back pairs of cross-sections. A fastener 60 with a shank 600 has two pairs of cross-sections 610, 620, and 630,640 within the helix 612 and two pairs of cross-sections 650, 660, 670, 680 following the helix 612. Sections 610, 620, 630, 640, are equivalent in size and relationship to sections 210 and 220 in FIGS. 1-9 and cross-sections 650, 660, 670, 680 are equivalent in size and relationship to sections 230 and 240 in FIGS. 1-9.

Figure 14:
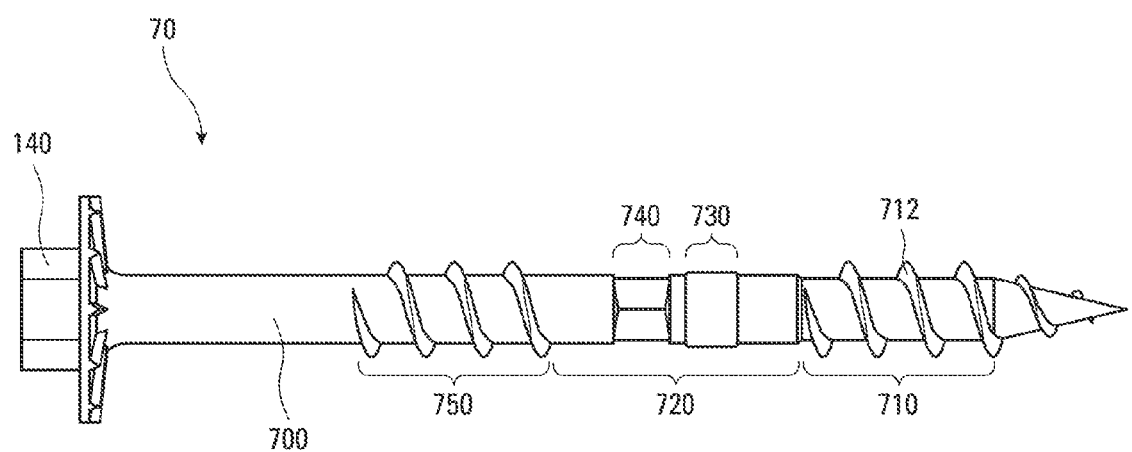
FIGS. 14 and 15 depict further alternative embodiments of the fastener in accordance with the present technology including multiple threaded regions surrounding a thread free region with one or multiple prolate cross-sections regions in the thread free region.
Figure 15:
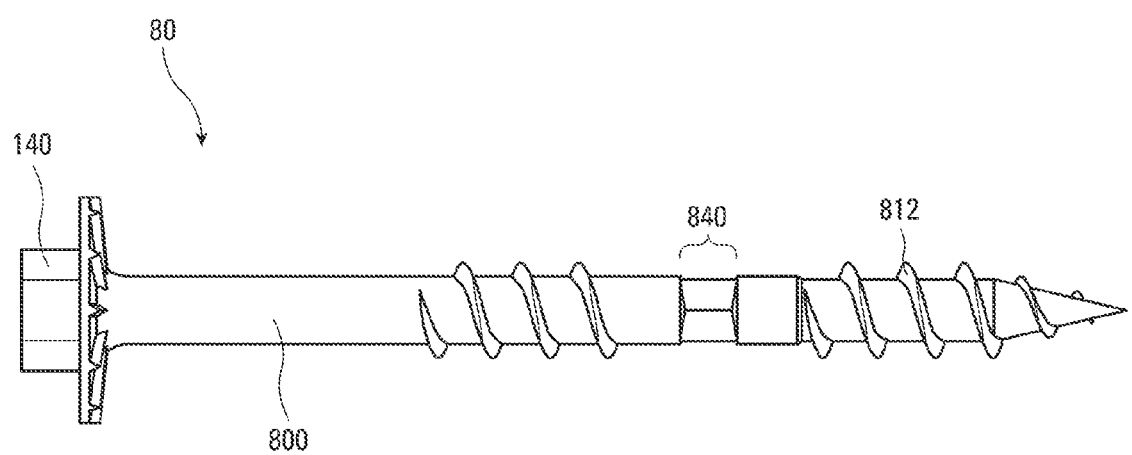

FIGS. 14 and 15 illustrate two additional embodiments of the present technology. Fastener 700 illustrates an embodiment wherein a threaded region 710 with thread 712 is followed by a thread free region 720 and a second threaded free region 750. Prolate cross section regions are provided in the thread free middle region. Regions 730 and 740 are 90 degree offset regions, but may be offset by any number of degrees. Fastener 800 illustrates an embodiment similar to that of FIG. 14 except that only one prolate region is provided.

In yet another embodiment, the cross-sections may have a length longer or shorter than pitch P. One design factor may be to provide that each forward progression with each rotation of the helix causes a full rotation of the bore by the cross-sections; hence a pair of cross-sections offset by 90 degrees may be used. The helix pitch and cross-section length L1 may be selected that the drive of the fastener into the hole is faster than the rotation of the fastener into the bore so that the cross-sections alone or in combination with a paired cross-section rotate fully over the turn of the screw. In another embodiment, the length of the cross-sections is shorter than one turn of the helix.

While the prolate cross-sections are illustrated herein in pairs, it should be understood that in various embodiments, any number of prolate cross-section regions may be provided, from a single prolate cross-section provided in either a fully-threaded fastener, or an unthreaded region of a fastener, to a plurality of sections comprising the entire length of the shaft. Further, cross-section regions may have any configuration of off-set relationship relative to other cross-sections such that any two cross-section regions may be off-set by 0-90 Degrees relative to their respective polar diameters. Moreover, the sum-total of all off-set angles between all prolate regions in a fastener need not total 90 degrees, but may be less than 90 degrees.

The screw is designed to be a self-boring screw into the material to be fastened. However, a pilot hole may be utilized.

A head 140 is provided at the other end of the shank 100. The head comprises a top portion which may include a disk 142 having a top surface and a bottom surface. In one embodiment, the top portion of the head 140 is formed to have a hex head; alternatively, a Phillips recess, a square or other shaped recess may be formed in the top of the head 140 to receive a driver. A bottom surface of disk 142 may include locking teeth 118. In one embodiment, twelve (12) locking teeth are formed in the bottom surface of the disk.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener, comprising:
a shank having a conical point at a first end and a head at a second end, the shank comprising a first portion having a circular cross-section with a diameter, the shank including a first sub-region having an elongated cylindrical shape with a first sub-region cross-section through the elongated cylindrical shape having polar cross-sectional distance greater than an equatorial cross-sectional distance, the equatorial cross-sectional distance being smaller than the diameter, the first portion being on a first side of the first sub-region, the shank including a second portion having a circular cross-section on a second side of the first sub-region.

2. The fastener of claim 1 further comprising a second sub-region adjacent to the first sub-region, the second sub-region having a polar cross-sectional distance and an equatorial cross-sectional distance, the polar cross-sectional distance of the second cross-section sub-region is greater than the equatorial cross-sectional distance, the polar cross-sectional distance of the first cross-section sub-region oriented at an angle relative to a polar cross-sectional distance of the second cross-section sub-region.

3. The fastener of claim 1 wherein the shank includes a threaded region, and the first sub-region is within the threaded region.

4. The fastener of claim 3 wherein the shank includes a non-threaded region, and the first cross-section sub-region is within the non-threaded region.

5. The fastener of claim 1 wherein the first sub-region has a lens shaped cross-section.

6. The fastener of claim 1 wherein the first sub-region has an elliptical cross-section.

7. The fastener of claim 2 wherein the angle is between 0 and 90 degrees.

8. A fastener, comprising:
a first region formed at a first end and having a helical thread, the first region having a cylindrical section with a circular cross-section of a first diameter;
a first sub-region within the first region such that the cylindrical section is on a first side and a second side of the first sub-region, the helical thread surrounding the cylindrical cross-section and the first sub-region, the first sub-region having polar cross-sectional distance greater than an equatorial cross-sectional distance; and
a second, thread-free region having a circular cross-section of a second diameter adjacent to the first region, wherein the equatorial cross-sectional distance is smaller than the first diameter and the second diameter.

9. The fastener of claim 8 wherein the first region has the first sub-region and a second sub-region, the second sub-region having a equatorial cross-sectional distance greater than a polar cross-sectional distance, the polar cross-sectional distance of the first sub-region rotationally offset relative to the polar cross-sectional distance of the second sub-region.

10. The fastener of claim 9 wherein the second region includes a third sub-region in the thread-free region.

11. The fastener of claim 10 wherein second region includes the third sub-region and a fourth sub-region, each third and fourth sub-region having a polar cross-sectional distance greater than an equatorial cross-sectional distance, a polar cross-sectional distance of the third sub-region rotationally offset relative to a polar cross-sectional distance of the fourth sub-region.

12. The fastener of claim 10 wherein the third sub-region is larger than the second sub-region.

13. The fastener of claim 9 wherein each sub-region extends a length along the fastener, and wherein the length of each sub-region is approximately equal to a distance between consecutive turns of the helical thread.

14. The fastener of claim 8 wherein the first region has the first sub-region and the second, thread free region includes a second sub-region within the second region such that the cylindrical cross-section of the second region is on a first side and a second side of the first sub-region, each sub-region having a polar cross-sectional distance greater than an equatorial cross-sectional distance, a polar cross-sectional distance of the first sub-region rotationally offset relative to a polar cross-sectional distance of the second sub-region.

15. A fastener, comprising:
a shank having a first pointed end and a second head end, the shank having a first region having a first circular cross-section portion having a first diameter;

a first sub-region in the first region;
a second sub-region in the first region and adjacent to the first sub-region; and
a helical thread in the first region surrounding the circular cross-section portion and the first and second sub-regions;
wherein each said sub-region has a cross section with an equatorial cross-sectional distance greater than a polar cross-sectional distance, and wherein each polar cross-sectional distance is smaller than the first diameter.

16. The fastener of claim 15 further including:
a second region in the shank having a circular cross-section with a second diameter;
a third sub-region in the second region;
a fourth sub-region in the second region and adjacent to the third sub-region;
wherein each said third sub-region and fourth sub-region has a sub-region cross-section with the equatorial cross-sectional distance greater than a polar cross-sectional distance;
wherein the helical thread in the first region terminates in the first region.

17. The fastener of claim 16 wherein the helical thread terminates adjacent to the third and fourth sub-regions.

18. The fastener of claim 16 wherein the third and fourth sub-regions have the polar cross-sectional distance that is 1 and 1.3 times greater than the equatorial cross-sectional distance of the first and second sub-regions.

19. The fastener of claim 16 wherein the third and fourth sub-regions have the polar cross-sectional distance that is 1 and 1.3 times greater than the polar cross-sectional distance of the first and second sub-regions.

20. The fastener of claim 16 wherein the equatorial cross-sectional distance of the first or second sub region is a range of about 1.4-1.0 relative to said second diameter of said second circular section and said equatorial cross-sectional distance of the first or second sub region is in a range of about 1.0-0.7 relative to said second diameter of said second circular cross-section.

21. The fastener of claim 15 wherein the polar cross-sectional distance is a range of about 1.4-1.0 relative to said first diameter and said equatorial cross-sectional distance is in a range of about 1.0-0.7 relative to said first diameter.

22. The fastener of claim 15 wherein the helical thread has a pitch, each of said first and second sub-regions has a length, and said length is approximately 0.7 to 2.0 times said pitch.

23. The fastener of claim 15 wherein the equatorial cross-sectional distances of the first and second sub-regions are offset with respect to one another by an angle of about 0-90 degrees.

24. The fastener of claim 15 ratio of the polar cross-sectional distance to the equatorial cross-sectional distance is about 1.4-1.

* * * * *